July 7, 1959  S. POSEN  2,894,076
EYEGLASS HEARING AID CONSTRUCTION
Filed Feb. 7, 1957  2 Sheets-Sheet 2

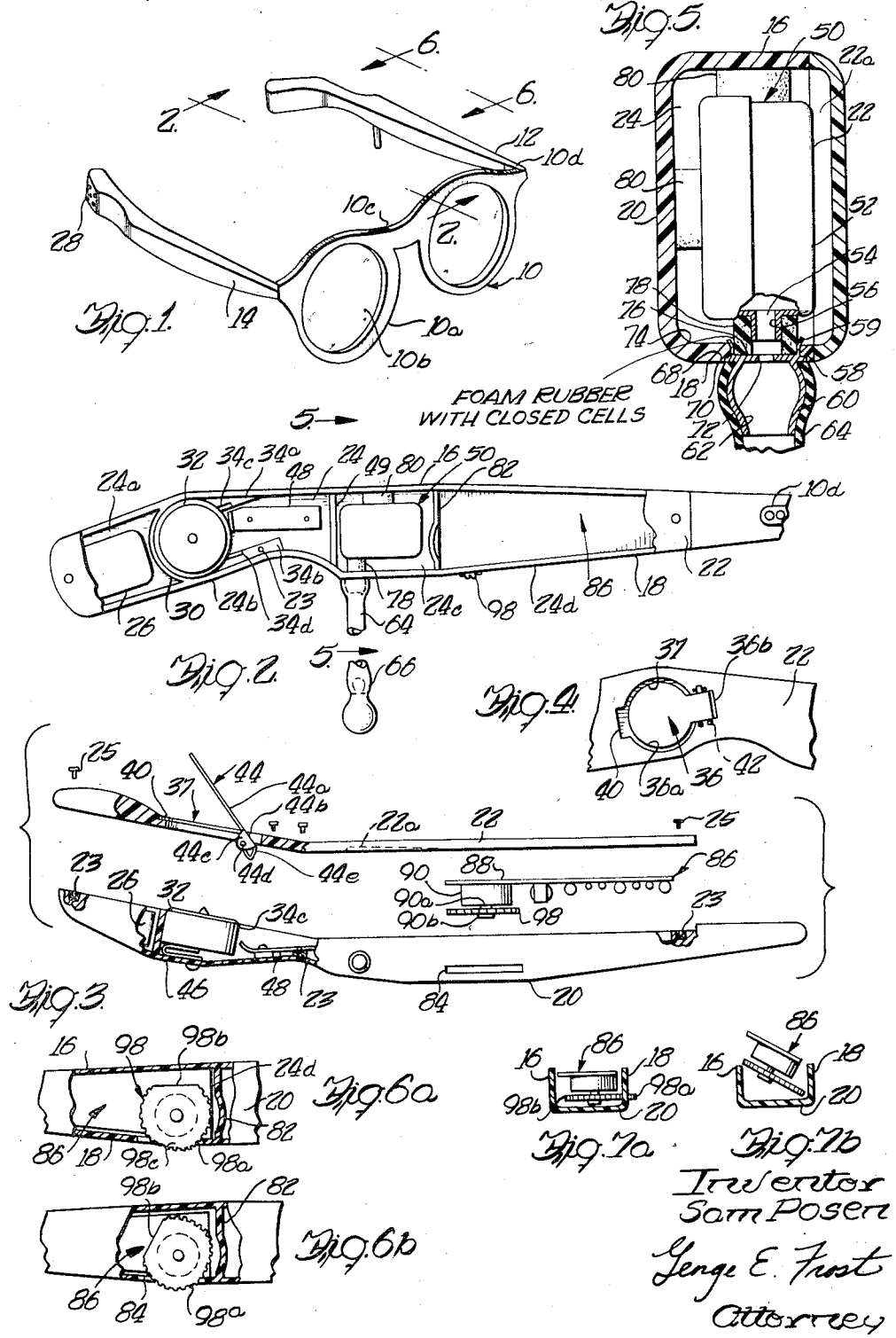

INVENTOR.
Sam Posen
BY George E. Frost
Attorney

United States Patent Office 2,894,076
Patented July 7, 1959

2,894,076

EYEGLASS HEARING AID CONSTRUCTION

Sam Posen, Chicago, Ill., assignor to Beltone Hearing Aid Company, Chicago, Ill., a corporation of Illinois Application February 7, 1957, Serial No. 638,727

8 Claims. (Cl. 179—107)

This invention relates to an improved receiver mounting construction for an eyeglass hearing aid.

This application is a continuation-in-part of my application, entitled Eyeglass Hearing Aid Construction, Serial Number 607,404, filed August 31, 1956, now Patent No. 2,878,322. The structure herein shown may be utilized also in an eyeglass hearing aid of the kind shown in my patent application entitled Eyeglass Hearing Aid Construction, Serial No. 638,726, filed February 7, 1957, now abandoned.

Eyeglass hearing aids present an unusual problem of compactness since the operative elements must be contained within the temple parts of the eyeglass frame. Moreover, an effective unit requires that the bulky parts of the hearing aid, including the microphone and the receiver, be located close together within the portion of the temple located over and behind the ears as is shown in my above-identified patent application. This location is also desirable to provide binaural hearing and to facilitate transmission of sound from the receiver to the ear.

These considerations accent the problem of both mechanical coupling between the receiver and the temple member in which it is located and accoustical coupling between receiver and microphone. At the same time, however, the receiver must be so supported that the sound output therefrom may be communicated out of the temple member and into the ear of the user. The present invention contemplates the use of a tubular sound output member which is fixedly sustained in the temple member and does not partake of the receiver vibration incident to the production of sound. Sound is conducted from the receiver into the tubular sound output member through a chamber defined in part by a resilient member which is affixed to the receiver and to the temple member to form a closed passage for sound while at the same time not coupling the receiver and temple member in any manner causing significant mechanical coupling or accoustical feedback. The various forms of the invention herein disclosed thus serve to provide the necessary sound output to the ear of the user without tending to cause oscillation or "singing" by reason of mechanical coupling or accoustic feedback.

The material defining the flexible wall of the sound output chamber is a foam rubber having closed cells or gas bubbles. Such foam rubber is characterized by the ability to form a physical connection between the receiver and the temple member without introducing substantial mechanical coupling, while at the same time it serves to confine the output sound vibrations to the interior of the sound output passages.

It is an object of the present invention to provide an improved mounting for an eyeglass hearing aid receiver by which the receiver is isolated from the rigid temple member in which it is carried.

It is yet another object of the present invention to provide means defining a sound passage from a receiver positioned inside the temple member of an eyeglass hearing aid to an ear piece outside the temple member whereby the receiver is mechanically isolated from the rigid temple member and accoustic transmission between the interior of the sound output passage and the interior of the temple member is prevented.

It is still another object of the present invention to provide means defining a sound passage from a receiver inside a temple member of an eyeglass hearing aid which aids in sustaining the receiver within the temple member.

Additional objects of the present invention include the provision of a cushion mounting for the receiver of an eyeglass hearing aid which is of compact and simple construction, is inexpensive to manufacture, and is effective in operation.

The novel features which I believe to be characteristic of my invention are set forth with particularity in the appended claims. The invention, itself, however, both as to its organization and method of operation, will best be understood by reference to the following description taken in connection with the accompanying drawings in which:

Figure 1 is a view in perspective of an eyeglass hearing aid;

Figure 2 is a view through section 2—2 of Figure 1 with a part of the cover of the temple member broken away;

Figure 3 is an exploded bottom view of the temple member, with parts of the temple member and cover shown in cross-section;

Figure 4 is an elevational view of a portion of the detachable cover showing the battery opening without the metal covering in place;

Figure 5 is a view through section 5—5 of Figure 2;

Figure 6a is a view through section 6—6 of Figure 1;

Figure 6b is a view similar to 6a except with the knob in position of normal use;

Figure 7a is a view looking forward through the temple member with the cover removed showing the amplifying unit in position within the temple member;

Figure 7b is a view similar to Figure 7a except that the amplifying unit is cocked for removal from the temple member;

Figure 10:
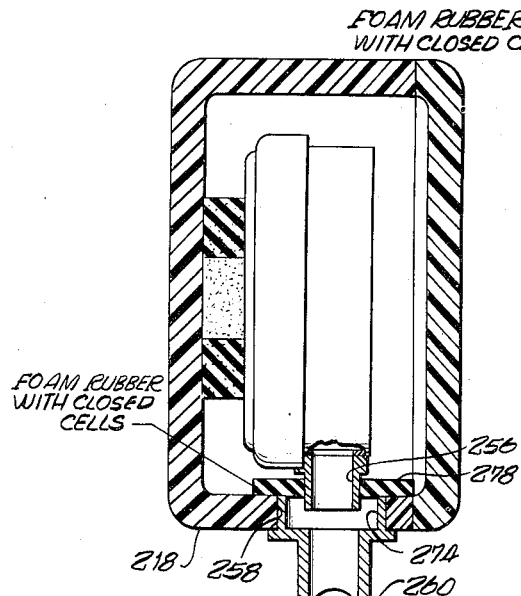
Figure 10 is a view through a temple member similar to the view of Figure 5 showing another form of the present invention.

The eyeglass hearing aid embodying the present invention is shown generally in Figure 1. The eyeglass hearing aid has a front 10 and a pair of temple members 12 and 14. The front 10 may, for example, include a pair of lens-receiving frames 10a, lens 10b within the frames, and a nose bridge 10c connecting the frames. The temple members 12 and 14 each have a hinge 10d connected at one end which connects to the outboard edge of front 10.

The temples 12 and 14, which may be made of plastic material, are shaped to bear against the head of the wearer over the ears as conventional eyeglass temples. The components of a complete hearing aid are contained within one temple. If the wearer's hearing is defective in only one ear, the other temple may be without hearing aid components. If hearing in both ears is defective each temple may house a hearing aid. If both temples contain hearing aid units the construction may be similar in each temple. For convenience only the details of temple 12 are herein described.

The temple 12 is of generally channel shaped construction as shown best in Figure 5, having an upper wall 16, a lower wall 18, and an outer wall, or web, 20. An inner wall 22 is removable and constitutes a detachable cover for the temple member. The cavity 24 defined by the walls of the temple member contains the components of a complete hearing aid.

As shown in Figure 2, the cavity 24 defined by the walls of the temple is divided into sections or compartments 24a, 24b, 24c, and 24d, each receiving parts of the hearing aid unit as hereinafter described. Immediately to the rear of compartment 24a, which is the rear section of the hearing aid, and forward of the section 24d, which is the forward section of the hearing aid, are solid sections which have embedded therein a metal socket 23 having internal threads, as shown in Figure 3. These sockets receive the screws 25 which pass through the cover 22 and secure the cover in position on the temple member. In the central section of the temple member are two additional sockets receiving screws 25 to hold the cover in place as hereinafter described. The rear section 24a of cavity 24 houses a microphone 26. One wall of the temple member adjacent section 24a has an opening, or openings 28, through which airborne sound waves can be carried to the microphone (see Figure 1). The microphone 26 is carried by a foam rubber washer or other deformable member to minimize transmission of mechanical vibration from the temple member to the microphone. Preferably this supporting member also defines a sound passage from openings 28 to the microphone which is at least in part acoustically insulated from the interior of the cavity 24a.

Immediately forward of section 24a and separated therefrom by the arcuate wall 30, is section 24b which houses the hearing aid battery 32. Forward of the battery are solid portions 34a and 34b which extend from the top and bottom wall 16 and 18, respectively. The inner edges of the solid portions are cut to form shoulders 34c and 34d, respectively. The solid portion 34b has embedded therein a socket 23 to receive screw 25 passing through the cover to secure the cover to the temple member. As shown in Figure 4, the inner wall or cover 22 has an opening 36 with a circular portion 36a and forward thereof rectangular portion 36b. The opening 36 is aligned with the section 24b when the cover 22 is in position. The circular portion 36a of the opening is slightly larger at the exterior face of wall or cover 22 to form the shoulder 37 at the margin of the opening. The exterior face of the cover 22 has a slight depression 40 forward of the circular portion 36a of the opening. Adjacent the rectangular portion 36b of the opening and on either side thereof are protrusions 42 extending from the inner face of the wall or cover 22.

The battery section 24b has a metal cover 44 having a shape conforming with the opening 36, with a circular portion 44a and a rectangular portion 44b (see Figure 3). Depending from each side of the rectangular portion are ears 44c which carry pin 44d. Depending from the rear of the rectangular section is heel portion 44e. The ends of pin 44d seat on shoulders 34c and 34d respectively and nestle between protrusions 42 when the cover 22 is in place on the temple member. The circular portion of the metal cover seats on shoulder 37 in the circular portion of the opening 36. The fingernail of the wearer may be inserted in depression 40 to raise the cover for replacement of the battery 32. A clip 46 is secured at the bottom of the battery section 24b and contacts one element on the battery. Another clip 48 is secured between the solid portions 34a and 34b and contacts heel 44e of the metal cover to establish electrical contact with the other element of the battery through the metal cover 44. The forward end of clip 48 seats on a base having a socket 23 embedded therein. A screw 25 passes through the cover and clip and engages the socket to secure the cover in place.

Immediately forward of section 24b and divided therefrom by wall 49 is section 24c which receives the receiver 50. As shown in Figure 5, the receiver 50 has a casing 52 having a protruding circular sound output tube 56 with a sound conducting bore or opening 54. The lower wall 18 of the temple member has an opening 58 aligned with the sound output opening 54, and the tube 56. The opening 58 receives a rigid fitting 60 which has, outside the temple member, an enlarged tube-receiving portion 62. The portion 62 receives the plastic sound tube 64 and, as shown, securely holds the sound tube. The hollow sound tube 64 leads to the ear piece 66 which is inserted in the ear of the user and has a continuation of the sound passage of tube 64 to transmit sounds to the interior of the ear.

The fitting 60 has an opening 58 which coacts with the upstanding lip 59 to form a socket. The fitting 60 has a circular flange 70 which seats on shoulder 68 of the temple member. That portion of the fitting 60 which extends through the wall 18 has a circular central bore 72 adjacent the outer face of wall 18 and a larger bore 74 adjacent the inner face of wall 18 to define a shoulder 76 inside the fitting. The wall of that part of the fitting extending through wall 18 is bent outwardly at the inner face of wall 18 to fixedly secure the fitting in position.

A short, flexible cushioning tube 78 of material described in further detail hereafter is snugly received at one end on the tube 56 of the receiver. At the opposite end the tube 78 is snugly received in the bore 74 of the fitting 60 and seats against shoulder 76. Thus a continuous passage from inside the casing 52 of the receiver to the ear piece 66 is defined. The receiver 50 is held out of contact with the walls of the cavity section 24c by blocks of cushioning material 80 interposed between the walls and the receiver. These are of foam rubber or other material that does not significantly transmit mechanical vibrations but need not have the property of low acoustic transmission hereinafter described. Although the blocks 80 may be interposed between each wall and the receiver it is not necessary that the receiver be held by the blocks from contact with every wall since the tube 78 engages both the tube 56 on the receiver and the fitting 60 to assist in holding the receiver in position in section 24c. Thus, for example, with no cushioning material between the receiver 50 and the detachable cover 22 the receiver will be held in spaced relation to the cover by the cushioning tube 78 and the cushioning blocks 80 sandwiched between the receiver and some of the other walls of the temple member. The cover 22 has a depression 22a on its inner face adjacent the receiver 50 to provide additional clearance for that unit.

Immediately forward of section 24c and separated therefrom by wall 82 is section 24d. A slot 84 is cut in the lower wall 18, which is one of the walls defining section 24d, adjacent the rear portion of that section. The slot is cut in the longitudinal direction parallel to wall, or web, 20 and adjacent that wall.

The section 24d receives the amplifying unit shown generally at 86 in Figure 3. The amplifying unit consists of chassis 88 and the components of the amplifying circuit. The chassis may have a circuit (not shown) printed thereon. The components include a volume control unit 90 and may include transistors, capacitors, resistors and a transformer. The volume control unit has a rotatable shaft 90a internally threaded at its outer end. The knob or disc 98 is received on the end of shaft 90 and secured thereto by screw 90b.

The knob or disc 98 has a generally circular edge portion 98a and a second edge portion 98b which may be straight to define a flat. The second edge portion 98b has a smaller radial reach than the circular edge portion 98a of the knob or disc. The diametral distance across the knob or disc from the second edge portion 98b to the diametrically opposite edge is less than the span or distance between wall 16 and 18 of the section 24d. The radius of the knob or disc at its circular edge portion 94a is sufficiently large so that when the amplifying unit 86 is received in the section 24d the circular portion of the knob or disc will extend through the slot 84 and extend outside of the temple member. A notch 98c or other suitable marking is put on the disc or knob opposite the second edge portion 98b.

With this construction the knob or disc extends through the temple and may be readily rotated by the wearer for control from outside the temple member. At the same time, despite the fact that the knob or disc extends through the temple, the amplifying unit 86 is readily removable from section 24d of the temple when the cover 22 is removed. In use the disc will be in a position to give the volume required for the wearer. As shown in Figure 6b, although the circular edge portion 98a will extend through the slot 84, the second edge portion 98b of smaller reach will not usually be opposite the slot 84. In order to remove the amplifying unit 86 from the temple member the disc is rotated to the position of Figure 6a with the second edge portion 98b of smaller reach opposite the slot 84. Another view of the disc in this position is shown in Figure 7a. The disc is pushed through the slot 84 causing the amplifying unit to rotate, thus elevating the side opposite the slot. After the amplifying unit is cocked in this manner, as shown in Figure 7b it can then be readily disengaged from the temple member.

Figure 8:
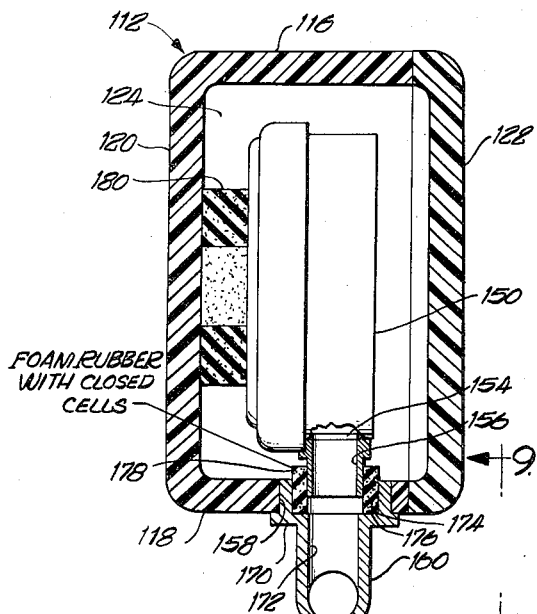
Figure 8 is a view through a temple member similar to the view of Figure 5 showing a modified form of the present invention.

In another form of the present invention, as shown in Figure 8, the receiver 150 is mounted in the cavity 124 defined by the upper wall 116, the outer wall 120, the lower wall 118, and the inner wall, or detachable cover, 122 of the temple member 112. The receiver 150 has a sound output opening 154. A protruding tube 156 is affixed to the receiver and has its opening aligned with an opening 158 in the lower wall 118 of the temple member. A rigid tubular fitting 160 is snugly received in the opening 158 as shown. The portion of the fitting received in the wall 118 has an inner bore 174 defining a socket. The fitting 160 has a tubular portion extending outside the temple member having an inner bore 172 which is smaller in diameter than the bore 174, forming a shoulder 176 where the bores join. This protruding portion of the fitting 160 is bent at 162 to receive a flexible plastic sound tube 164 leading to the ear mold worn by the user. The fitting 160 has a flange 170 which seats against the outer surface of the lower wall 118. A short flexible cushioning tube 178 is telescoped at one end over the protruding tube 156. The opposite end of the cushioning tube 178 seats on the shoulder 176 formed by socket 174 and is telescoped in the socket as shown.

The fittings 160 and 60 are of rigid material, preferably metal, which is snugly received in the temple member to form a rigid connection therewith. The cushioning tubes 178 and 78 are of material having both low mechanical vibration transmission and low acoustic transmission as hereinafter described.

Figure 9:
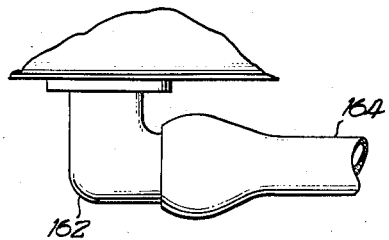
Figure 9 is a view through section 9—9 of Figure 8.

In the embodiment of the present invention shown in Figure 10 the protruding sound outlet tube 256 of the receiver and the fitting 260 affixed to the temple member are of like construction as the parts 156 and 160, Figures 8 and 9. The cushioning member 278, however is in the form of a flexible sheet which flexes in diaphragm action to accommodate relative movement of the receiver and temple member. The cushioning member 278 is preferably secured at its outer margins to the inside face of the temple member, and its opening telescopes over the sound outlet tube 256 to define a chamber in conjunction with the socket portion 274 of the fitting 260.

Figure 11:
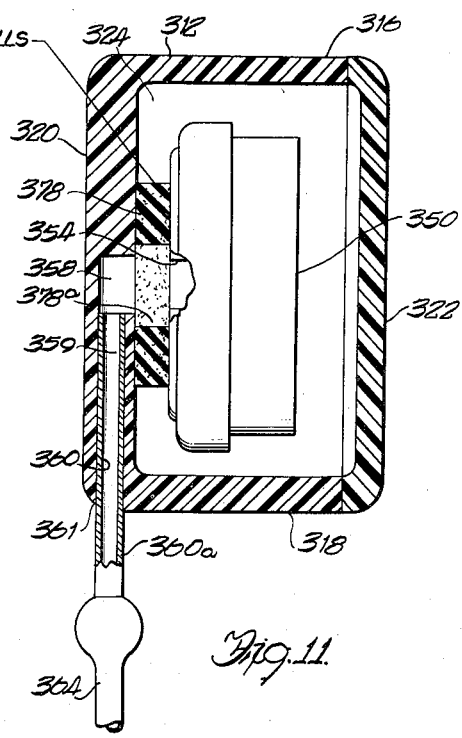
Figure 11 is a view similar to Figure 5 showing yet another form of the present invention.

Still another modification of the present invention is shown in Figure 11. In this embodiment the receiver 350 is housed in the cavity 324 defined by the upper wall 316, the outer wall 320, the lower wall 318, and the detachable inner wall 322 of the temple member 312. The receiver 350 has a sound output opening 354 which is in registration with a socket 358 in the inner surface of the wall 320. A tube 360 extends through the wall 320 parallel to the surface thereof from socket 358 to the protruding portion 360a which extends outboard of the temple member adjacent the lower wall 318. A flexible sound tube 364 is telescoped over the head formed on the protruding portion of the tube 360 and extends to the ear piece worn by the user (not shown). A closed sound passage is defined from the receiver 350 to the tube 364 by means of the resilient deformable washer 378 which has a bore 378a extending from the sound output opening 354 of the receiver 350 to the socket 358. Since the washer 378 is of foam rubber or other material characterized by an ability to accommodate relative motion between the receiver 350 and the temple member as hereinafter described, the washer 378 does not provide mechanical coupling between the receiver and temple member. Moreover, in the construction shown, one side of the washer 378 may be cemented to the receiver and the other side cemented to the inside face of the temple member 320, so that the washer serves the dual purpose of providing a closed sound passage and providing a support for the receiver.

The cushioning tubes 78 and 178, and the cushioning members 278 and 378 must have the dual characteristics of ease of deformation and high resistance to the communication of vibrations and acoustic impermeability. These requirements are to some extent conflicting, because the low density (achieved for example by using a foam rubber) that serves to reduce the transmission of vibration between the temple member and the receiver also tends to permit the escape of sound from the socket (74, 174, 274, and 358) to the interior of the chamber formed in the temple member, and thereby provide acoustic feedback through the air of the chamber to the microphone and thus causes oscillation and singing. I have found, however, that if foam rubber having a great number of closed cells or gas pockets is used, these usually conflicting requirements are met. In other words the foam rubber is readily deformed and light in weight—as required to provide mechanical insulation between the receiver and temple—and at the same time the foam rubber does not transmit acoustic vibrations from the socket (74, 174, 274, and 358) to the interior of the temple member. This is believed to be due to the characteristics of such foam rubber of having cells or bubbles that are not in communication with each other, and hence do not define a continuous air path from one side of the foam rubber to the other side thereof.

A particular foam rubber found to be especially suitable for the present invention is that identified as G200–C and manufactured by Great American Industries, Inc., Rubatex Division. This material meets American Society of Testing Materials, Schedule R–41. The weight required to compress a 1.129" diameter disc of this material by 25% is between 2 and 5 pounds per square inch. Its durometer is 35±10 points by the Shore "00" test. The bubbles in the rubber are filled with nitrogen.

It will be noted that the fixed fittings 60, 160, 260, and 360 define rigid paths of communication between the sound output passages and the interior of the temple member. There is accordingly an opportunity for the fitting and the supporting temple members to vibrate in response to the sound vibrations; for such vibrations to be transmitted to the air in the interior of the temple member; and for the microphone to respond to such vibrations and cause feedback or singing. In practical fact, however, this does not occur and—contrary to what would be expected—this form of theoretical feedback is of no practical consequence. This is believed to be due to the low coupling coefficient between the sound in the sound output passages and the fitting.

While I have shown and described specific embodiments of the present invention, it will, of course be understood that various modifications and alternative constructions may be made without departing from the true spirit and scope of the invention. I therefore intend by the appended claims to cover all such modifications and alternative constructions as fall within their true spirit and scope.

What I claim as new and desire to secure by Letters Patent is:

1. In an eyeglass hearing aid the improvement comprising in combination: a temple member having walls defining a cavity therein, one of said walls having a sound output opening; a tubular fitting fixedly received in said opening and protruding outside the temple member to receive a sound tube; said fitting coacting with said opening to define a socket in communication with the tube of the fitting and otherwise sealing the temple member; a receiver in the cavity having a sound output opening in registered spaced relation with the socket, the sound output opening having a protruding tube in spaced aligned relation to the fitting; a cushioning tube spanning the space between the protruding tube and the fitting to define a sound passage extending from the receiver to the protruding portion of the fitting and out of acoustical contact with the interior of the temple member, said cushioning tube being of low mechanical vibration conducting and low acoustical conducting material 2. In an eyeglass hearing aid the improvement comprising in combination: a temple member having walls defining a cavity therein, one of said walls having an opening; a rigid fitting fixedly received in said opening, the fitting forming a socket and having a portion protruding outside the temple member; a sound tube received on the portion of the fitting protruding outside the temple member; a receiver in the cavity having a protruding tube defining a sound output opening in registered spaced relation with the fitting and extending into the confines of the socket in spaced relation to the fitting; a cushioning ring affixed at its margins to the temple member and telescoping over the protruding tube of the receiver to span the space between the protruding tube and the fitting to define a chamber acoustically isolated from the interior of the temple member and a sound passage to the protruding portion of the fitting while permitting relative movement between the receiver and the temple, said cushioning ring being of low mechanical vibration conducting and low acoustical conducting material.

3. In an eyeglass hearing aid, the improvement comprising a temple member having a cavity; a microphone located in said cavity and adapted to respond to sounds from outside the temple member; a receiver also located in the cavity and having a sound output opening; a rigid tubular fitting mounted in the temple member and protruding from the same to receive a sound output tube to the ear of the user, the tube defined by said fitting terminating in a socket facing the interior of the temple and in registration with the sound output opening of the receiver; and a member affixed to the receiver and to the temple member and defining a sound passage from the sound output passage of the receiver to the socket which is acoustically isolated from the interior of the temple member while relative movement between the receiver and the temple member is permitted, said member being of low mechanical vibration conducting and low acoustical conducting material.

4. In an eyeglass hearing aid, the improvement comprising a temple member having a cavity; a microphone located in said cavity and adapted to respond to sounds from outside the temple member; a receiver also located in the cavity and having a sound output opening; a rigid tubular fitting mounted in the temple member and protruding from the same to receive a sound output tube to the ear of the user, the tube defined by said fitting terminating in a socket facing the interior of the temple and in registration with the sound output opening of the receiver; and a member affixed to the receiver and to the temple member and defining a sound passage from the sound output passage of the receiver to the socket which is acoustically isolated from the interior of the temple member while relative movement between the receiver and the temple member is permitted, said member being of closed cell foam rubber material.

5. In an eyeglass hearing aid, the improvement comprising a temple member having a cavity; a microphone located in said cavity and adapted to respond to sounds from outside the temple member; a receiver also located in the cavity and having a sound output opening; a rigid tubular fitting mounted in the temple member and protruding from the same to receive a sound output tube to the ear of the user, the tube defined by said fitting terminating in a socket facing the interior of the temple and in registration with the sound output opening of the receiver; and a member affixed to the receiver and to the temple member constituting the sole support for the receiver and defining a sound passage from the sound output passage of the receiver to the socket which is acoustically isolated from the interior of the temple member while relative movement between the receiver and the temple member is permitted, said member being of low mechanical vibration conduction and low acoustical conducting material.

6. A mounting for an eyeglass hearing aid receiver comprising in combination: an elongated temple member having walls defining a cavity therein and a detachable cover to enclose said cavity, one of said walls having an opening; a fitting fixedly received in said opening and protruding outside the temple member to receive a sound tube; a receiver in the cavity having a sound output opening in registered spaced relation with the fitting, the sound output opening having a protruding tube in spaced relation to the fitting; a cushioning tube spanning the space between the protruding and the fitting defining a sound tube therebetween and supporting the receiver in the cavity; and cushioning means interposed between some of the walls of the temple member and the receiver to sustain the receiver, in conjunction with the cushioning tube, out of contact with the temple walls and in spaced relation to the cover.

7. A mounting for an eyeglass hearing aid receiver comprising in combination: an elongated temple member having walls defining a cavity therein, one of said walls having an opening; a fitting fixedly received in said opening and protruding outside the temple member to receive a sound tube; a receiver in the cavity having a sound output opening in registered spaced relation with the fitting, the sound output opening having a protruding tube in spaced relation to the fitting; a cushioning tube spanning the space between the protruding tube and the fitting and defining a sound tube therebetween; and cushioning means sustaining the receiver in spaced relation to the temple member.

8. A mounting for an eyeglass hearing aid comprising in combination: a temple member having walls defining a cavity therein and a detachable cover to enclose said cavity, one of said walls having an opening; a tubular fitting fixedly received in said opening, the fitting having an internal shoulder and a portion protruding outside the temple member; a sound tube received on the portion of the fitting protruding outside the temple member; a receiver in the cavity having a sound output opening in registered spaced relation with the fitting, the sound output opening having a protruding tube in spaced relation to the fitting; a cushioning tube spanning the space between the protruding tube and the fitting defining a sound tube therebetween, the cushioning tube received at one end on the receiver tube and at the other end received in the fitting to seat on the fitting shoulder thereby supporting the receiver in the cavity; and cushioning means interposed between some of the walls of the temple member and the receiver to sustain the receiver in conjunction with the cushioning tube, out of contact with the temple walls and in spaced relation to the cover.

No references cited.